(12) United States Patent
Zhang et al.

(10) Patent No.: US 10,582,028 B2
(45) Date of Patent: Mar. 3, 2020

(54) SYSTEMS AND METHODS FOR INDICATING AND DETERMINING CHANNEL STRUCTURE INFORMATION

(71) Applicant: ZTE CORPORATION, Guangdong (CN)

(72) Inventors: Chenchen Zhang, Guangdong (CN); Peng Hao, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 16/389,259

(22) Filed: Apr. 19, 2019

(65) Prior Publication Data

US 2019/0312958 A1    Oct. 10, 2019

Related U.S. Application Data

(63) Continuation of application No. PCT/CN2017/096865, filed on Aug. 10, 2017.

(51) Int. Cl.
*H04L 29/06* (2006.01)
*H04L 27/26* (2006.01)
*H04W 72/04* (2009.01)

(52) U.S. Cl.
CPC .......... *H04L 69/22* (2013.01); *H04L 27/2662* (2013.01); *H04L 27/2666* (2013.01); *H04W 72/0446* (2013.01)

(58) Field of Classification Search
CPC . H04L 69/22; H04L 27/2662; H04L 27/2666; H04W 72/0446
See application file for complete search history.

(56) References Cited

U.S. PATENT DOCUMENTS

| | | | |
|---|---|---|---|
| 2017/0230087 A1* | 8/2017 | Sun | H04B 7/024 |
| 2017/0257860 A1* | 9/2017 | Nam | H04L 27/2602 |
| 2018/0146439 A1* | 5/2018 | Kim | H04W 52/283 |
| 2018/0234955 A1* | 8/2018 | Lin | H04W 72/042 |
| 2018/0367289 A1* | 12/2018 | Kim | H04L 5/14 |
| 2019/0053227 A1* | 2/2019 | Huang | H04L 5/0098 |

(Continued)

FOREIGN PATENT DOCUMENTS

WO    2016/021903 A1    2/2016

OTHER PUBLICATIONS

International Search Report dated May 2, 2018, in corresponding International Application No. PCT/CN2017/096865.

(Continued)

*Primary Examiner* — Benjamin H Elliott, IV
(74) *Attorney, Agent, or Firm* — Duane Morris LLP

(57) ABSTRACT

Systems and methods for indicating and determining channel structure information in a wireless communication network are disclosed herein. In one embodiment, a method performed by a first node is disclosed. The method comprises: receiving a wireless signal from a second node; obtaining channel structure information indicated by the wireless signal; determining a first waveform parameter set configured for the channel structure information indicated by the wireless signal; and determining transmission attributes of a transmission link between the first node and the second node in a predetermined time duration with respect to the first waveform parameter set based on the channel structure information.

11 Claims, 17 Drawing Sheets

(56) References Cited

U.S. PATENT DOCUMENTS

2019/0191322 A1* 6/2019 Sun .................. H04W 24/08

OTHER PUBLICATIONS

Extended European Search Report dated Oct. 9, 2019, in corresponding European Patent Application No. 17921356.6.
Catt, "[89-20] email discussion: Group-common PDCCH for NR", 3GPP TSG RAN WG1 Meeting #AH_NR2, R1-1710968,Qingdao, P.R. China, Jun. 27-30, 2017, pp. 1-22.
Kiaomi, "Discussion on the content of group common PDCCH", 3GPP TSG RAN WG1 NR Ad-Hoc#2, R1-1711369, Qingdao, P.R. China, Jun. 27-30, 2017, pp. 1-4.
Intel Corporation, "Group-common PDCCH: UE behavior", 3GPP TSG RAN WG1 NR Ad-Hoc#2, R1-1710549, Qingdao, P.R. China, Jun. 27-30,2017, pp. 1-6.

* cited by examiner

SYSTEMS AND METHODS FOR INDICATING AND DETERMINING CHANNEL STRUCTURE INFORMATION

CROSS-REFERENCE TO RELATED APPLICATION

The present application claims priority to PCT international application PCT/CN2017/096865, entitled "SYSTEMS AND METHODS FOR INDICATING AND DETERMINING CHANNEL STRUCTURE INFORMATION," filed on Aug. 10, 2017, which is expressly incorporated by reference herein in its entirety.

TECHNICAL FIELD

The disclosure relates generally to wireless communications and, more particularly, to systems and methods for indicating and determining channel structure information in a wireless communication network.

BACKGROUND

Over the past few decades, mobile communications have evolved from voice services to high-speed broadband data services. With further development of new types of businesses and applications, e.g. the mobile Internet and Internet of Things (IoT), the demands on data on mobile networks will continue to increase exponentially. Based on diversified business and application requirements in future mobile communications, wireless communication systems should meet a variety of requirements, such as throughput, latency, reliability, link density, cost, energy consumption, complexity, and coverage.

An LTE (Long-Term Evolution) system can support performing FDD (Frequency Division Duplex) operation on a pair of spectrums (e.g. performing downlink on one carrier and uplink on another carrier): It also supports TDD (Time Division Duplex) operation on an unpaired carrier. In a conventional TDD operation mode, only a limited number of configurations of uplink and downlink sub-frame allocations (corresponding to configuration 0 to configuration 6) are utilized. Adjacent areas use a same configuration, that is, with the same direction of transmission. The technology of eIMTA (enhanced interference mitigation and traffic adaptation) can configure semi-statically (at 10 ms or more) the uplink and downlink of the LTE system, and make adjacent areas use different configurations of TDD uplink and downlink sub-frame allocations. But these configurations are still limited to the several configurations described above.

Future wireless communication systems, such as the 5G/New Radio (NR) system, will support dynamic TDD operations, flexible Duplexing (or Duplexing flexibility) operations, and full Duplexing operations, in order to meet the fast adaptive requirements of the business and to further improve the efficiency of spectrum utilization. Taking dynamic TDD as an example, a dynamic TDD operation refers to dynamically or semi-dynamically changing the transmission direction as uplink or downlink, on the unpaired spectrum (or on the uplink or downlink carriers in the paired spectrum). Compared to eIMTA, dynamic TDD operations can support direction changes in a sub-frame level, a time slot level, or in an even more dynamic level. While an eIMTA system utilizes physical downlink control channel (PDCCH) to indicate TDD sub-frame configurations, a 5G/NR system will use group-common PDCCH to notify a group of terminals and/or users about some control information, e.g. slot format related information (SFI). For example, a base station (BS) in a 5G/NR system can indicate SFI via a group-common PDCCH to notify a group of terminals about channel structure information of a transmission link between the BS and each terminal within one or more time slots. The channel structure may include a pattern of transmission attributes, e.g. downlink (DL), uplink (UL), and/or OTHER of the transmission link.

There is no satisfactory solution in existing literatures or existing technologies for any of the following issues: (a) how the terminal can understand an SFI indication under different waveform parameter sets; (b) how the terminal can handle an OTHER filed in the channel structure, especially when a transmission direction indicated by the SFI conflicts with the transmission direction indicated by a user equipment (UE) specific downlink control information (DCI) and/or with the transmission direction under a semi-static configuration.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first node is disclosed. The method comprises: receiving a wireless signal from a second node; obtaining channel structure information indicated by the wireless signal; determining a first waveform parameter set configured for the channel structure information indicated by the wireless signal; and determining transmission attributes of a transmission link between the first node and the second node in a predetermined time duration with respect to the first waveform parameter set based on the channel structure information.

In another embodiment, a method performed by a first node is disclosed. The method comprises: configuring a first waveform parameter set and a predetermined time duration for a second node to determine transmission attributes of a transmission link between the first node and the second node; generating a wireless signal which indicates channel structure information related to the first waveform parameter set; and transmitting the wireless signal to the second node, wherein the second node determines transmission attributes of the transmission link in the predetermined time duration with respect to the first waveform parameter set based on the channel structure information.

In a further embodiment, a first communication apparatus comprising a processor, a memory and a wireless interface is disclosed. The memory stores instructions that, when executed, cause the processor to: receive a wireless signal from a second communication apparatus; obtain channel structure information indicated by the wireless signal; determine a first waveform parameter set configured for the channel structure information indicated by the wireless signal; and determine transmission attributes of a transmission link between the first communication apparatus and the second communication apparatus in a predetermined time duration with respect to the first waveform parameter set based on the channel structure information.

In yet another embodiment, a first communication apparatus comprising a processor, a memory and a wireless interface is disclosed. The memory stores instructions that, when executed, cause the processor to: configure a first waveform parameter set and a predetermined time duration for a second communication apparatus to determine transmission attributes of a transmission link between the first communication apparatus and the second communication apparatus; generate a wireless signal which indicates channel structure information related to the first waveform parameter set; and transmit the wireless signal to the second communication apparatus.

In still another embodiment, a non-transitory computer-readable medium having computer-executable instructions stored thereon is disclosed. The computer-executable instructions, when executed by a processor of a first node, causing the processor to implement a method comprising: receiving a wireless signal from a second node; obtaining channel structure information indicated by the wireless signal; determining a first waveform parameter set configured for the channel structure information indicated by the wireless signal; and determining transmission attributes of a transmission link between the first node and the second node in a predetermined time duration with respect to the first waveform parameter set based on the channel structure information.

In a further embodiment, a non-transitory computer-readable medium having computer-executable instructions stored thereon is disclosed. The computer-executable instructions, when executed by a processor of a first node, causing the processor to implement a method comprising: configuring a first waveform parameter set and a predetermined time duration for a second node to determine transmission attributes of a transmission link between the first node and the second node; generating a wireless signal which indicates channel structure information related to the first waveform parameter set; and transmitting the wireless signal to the second node.

In another embodiment, a communication node configured to carry out a disclosed method in some embodiment is disclosed.

In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
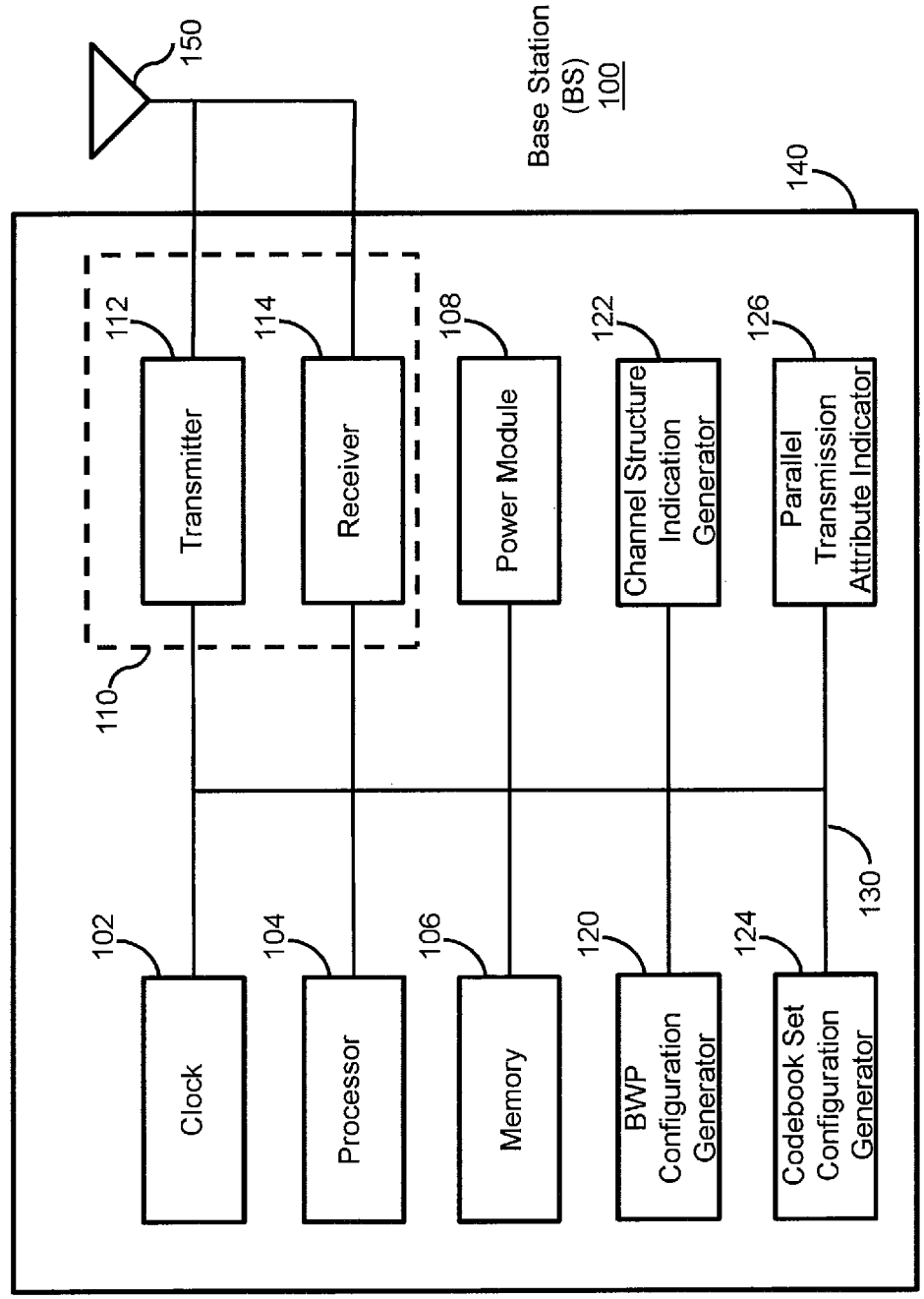
FIG. 1 illustrates a block diagram of a base station (BS), in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A BS in a 5G/NR system will use group-common PDCCH to notify a group of user equipment (UE) terminals about some control information, e.g. slot format related information (SFI), to indicate channel structure information of a transmission link between the BS and each UE within an effective time duration. The channel structure may include a pattern of transmission attributes, e.g. DL, UL, and/or OTHER, of the transmission link. There is no satisfactory solution in existing literatures or existing technologies for any of the following issues: first, how a UE can understand an SFI indication under different waveform parameter sets; and second, how a UE can handle an OTHER filed in the channel structure, especially when a transmission direction indicated by the SFI conflicts with the transmission direction indicated by a UE specific DCI and/or with the transmission direction under a semi-static configuration.

Regarding the first issue, since it has not yet been finalized to support which bandwidth part (BWP) configuration in 5G/NR, the present teaching will describe both a case for activating a single BWP and a case for activating multiple BWPs. A waveform parameter set, e.g. a Numerology, is closely related to BWP. For example, a Numerology configured by the system for a DL BWP can be applied to PDCCH (Physical Downlink Control Channel), PDSCH (Physical Downlink Shared Channel), and corresponding DMRS (Demodulation Reference Signal) within the DL BWP; and a Numerology configured by the system for a UL BWP can be applied to PUCCH (Physical Uplink Control Channel), PUSCH (Physical Uplink Shared Channel) and corresponding DMRS within the UL BWP. According to the current process of NR, a Numerology may correspond to a SCS (Sub-carrier space), an OFDM symbol length, the number of OFDM symbols contained in a slot, a CP (Cyclic Prefix) length, etc.

To solve the first issue, the present teaching provides methods and systems for a UE to determine channel structure, e.g. transmission attributes, of a transmission link between the UE and the BS, based on an SFI indication received from the BS, under different waveform parameter sets, e.g. under different Numerologies corresponding to different BWPs to be activated. According to various embodiments of the present disclosure, the SFI pattern may cover a predetermined number of slots or OFDM symbols, or a predetermined length of time; and the UE may determine the channel structure with or without an alignment of transmission attributes under different Numerologies.

Regarding the second issue, a 5G/NR system currently uses an OTHER field to mean "unknown." That is, the terminal will understand an OTHER field to be "the direction of transmission undetermined", without making any assumption, and not resolving the OTHER field to be "empty." To solve the second issue, the present teaching provides methods and systems for a UE to update transmission attributes in the OTHER fields to receive and/or transmit downlink and/or uplink signals in the OTHER fields, when a transmission direction indicated by the SFI is updated by the transmission direction indicated by a UE specific DCI and/or by the transmission direction under a semi-static configuration, in accordance with some embodiments of the present disclosure.

The methods disclosed in the present teaching can be implemented in a cellular communication network, which includes one or more cells. Each cell may include at least one base station (BS) operating at its allocated bandwidth to provide adequate radio coverage to its intended users, e.g. UE devices. In various embodiments, a BS in the present disclosure can include, or be implemented as, a next Generation Node B (gNB), a Transmission/Reception Point (TRP), an Access Point (AP), etc. In the present teaching, the terms "terminal" and "UE" will be used interchangeably.

A BS and a UE device can communicate with each other via a communication link, e.g., via a downlink radio frame from the BS to the UE or via an uplink radio frame from the UE to the BS. Each radio frame may be further divided into sub-frames which may include data symbols. A BS and a UE may be described herein as non-limiting examples of "communication nodes," or "nodes" generally, which can practice the methods disclosed herein and may be capable of wireless and/or wired communications, in accordance with various embodiments of the present disclosure.

FIG. 1 illustrates a block diagram of a base station (BS) 100, in accordance with some embodiments of the present disclosure. The BS 100 is an example of a device that can be configured to implement the various methods described herein. As shown in FIG. 1, the BS 100 includes a housing 140 containing a system clock 102, a processor 104, a memory 106, a transceiver 110 comprising a transmitter 112 and receiver 114, a power module 108, a BWP configuration generator 120, a channel structure indication generator 122, a codebook configuration generator 124, and a parallel transmission attribute indicator 126.

In this embodiment, the system clock 102 provides timing signals to the processor 104 for controlling the timing of all operations of the BS 100. The processor 104 controls the general operation of the BS 100 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 106, which can include both read-only memory (ROM) and random access memory (RAM), can provide instructions and data to the processor 104. A portion of the memory 106 can also include non-volatile random access memory (NVRAM). The processor 104 typically performs logical and arithmetic operations based on program instructions stored within the memory 106. The instructions (a.k.a., software) stored in the memory 106 can be executed by the processor 104 to perform the methods described herein. The processor 104 and memory 106 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 110, which includes the transmitter 112 and receiver 114, allows the BS 100 to transmit and receive data to and from a remote device (e.g., a UE or another BS). An antenna 150 is typically attached to the housing 140 and electrically coupled to the transceiver 110. In various embodiments, the BS 100 includes (not shown) multiple transmitters, multiple receivers, multiple transceivers, and/or multiple antennas. The transmitter 112 can be configured to wirelessly transmit packets having different packet types or functions, such packets being generated by the processor 104. Similarly, the receiver 114 is configured to receive packets having different packet types or functions, and the processor 104 is configured to process packets of a plurality of different packet types. For example, the processor 104 can be configured to determine the type of packet and to process the packet and/or fields of the packet accordingly.

The channel structure indication generator 122 may generate a wireless signal that indicates channel structure information about a transmission link between the BS 100 and a UE. For example, the wireless signal may be a group-common PDCCH signal that carries SFI to be broadcasted to a group of UE devices. The channel structure indication generator 122 may send, via the transmitter 112, the wireless signal to the group of UE devices for each UE to determine channel structures of the transmission link between the BS 100 and the UE on a BWP within a predetermined time duration, based on a waveform parameter set, e.g. a Numerology, corresponding to the BWP.

According to various embodiments of the present teaching, the predetermined time duration represents an effective time range of the SFI indication, and is determined by standardization requirements, semi-static configuration, or a dynamic indication generated by the channel structure indication generator 122. According to different embodiments, the effective time range of the SFI indication may be either an absolute time period irrelevant to any waveform parameter set, or a relative time period associated with a predetermined waveform parameter set. In the latter case, a length of the relative time period depends on values of a waveform parameter set, e.g. a Numerology, where this Numerology may be equal to at least one of: (a) a source Numerology under which an SFI pattern is indicated to the UE; (b) a target Numerology under which the UE will determine transmission attributes of the transmission link; and (c) a transmission Numerology under which the wireless signal is transmitted to the UE on a BWP.

The BWP configuration generator 120 may configure and activate one or more BWPs for a UE. For example, for a UE to determine channel structures on N (N is an integer greater than 1) BWPs, it is possible to configure the UE to detect and receive SFI on one or more of the N BWPs. The N BWPs may have same or different Numerologies. The BWP configuration generator 120 can configure Numerology for each BWP independently and inform the configuration of BWP to the channel structure indication generator 122 for generating SFI indication.

The codebook configuration generator 124 may generate and configure a set of structural codebooks. The set of structural codebooks includes a set of channel structure patterns, e.g. SFI patterns, covering a predetermined number of slots or OFDM symbols, or a predetermined length of time, according to different embodiments of the present teaching. A UE may be informed of the set of structural codebooks based on standardization or semi-static configuration by the codebook configuration generator 124. Having knowledge of the set of structural codebooks, the UE can obtain a specific SFI pattern by looking up the structural codebooks according to an SFI indication generated and transmitted by the channel structure indication generator 122, and determine channel structures of the transmission link between the BS 100 and the UE on a BWP based on the specific SFI pattern, while taking into account the Numerology corresponding to the BWP.

The parallel transmission attribute indicator 126 may generate indications of transmission attributes of the transmission link, in a parallel manner to the SFI indication. For example, the parallel transmission attribute indicator 126 may indicate transmission attributes based on a UE specific DCI and/or a semi-static configuration signal. While an SFI in a group-common PDCCH is broadcasted to a group of UE devices, the UE specific DCI is sent, via the transmitter 112, to a specific UE. When there is a conflict between the transmission directions indicated by the SFI and the parallel indicator generated by the parallel transmission attribute indicator 126, the UE may update the transmission attributes based on the latest transmission attribute indication.

In one embodiment, the processor 104 may determine which scheme is to be used for determining the channel structures. For example, the processor 104 can determine whether an SFI pattern covers a predetermined number of slots or OFDM symbols, or a predetermined length of time; and can also determine whether the UE should determine the channel structure with or without an alignment of transmission attributes under different Numerologies. The processor 104 can determine the scheme according to standardization or a dynamic configuration.

The power module 108 can include a power source such as one or more batteries, and a power regulator, to provide regulated power to each of the above-described modules in FIG. 1. In some embodiments, if the BS 100 is coupled to a dedicated external power source (e.g., a wall electrical outlet), the power module 108 can include a transformer and a power regulator.

The various modules discussed above are coupled together by a bus system 130. The bus system 130 can include a data bus and, for example, a power bus, a control signal bus, and/or a status signal bus in addition to the data bus. It is understood that the modules of the BS 100 can be operatively coupled to one another using any suitable techniques and mediums.

Although a number of separate modules or components are illustrated in FIG. 1, persons of ordinary skill in the art will understand that one or more of the modules can be combined or commonly implemented. For example, the processor 104 can implement not only the functionality described above with respect to the processor 104, but also implement the functionality described above with respect to the BWP configuration generator 120. Conversely, each of the modules illustrated in FIG. 1 can be implemented using a plurality of separate components or elements.

Figure 2:
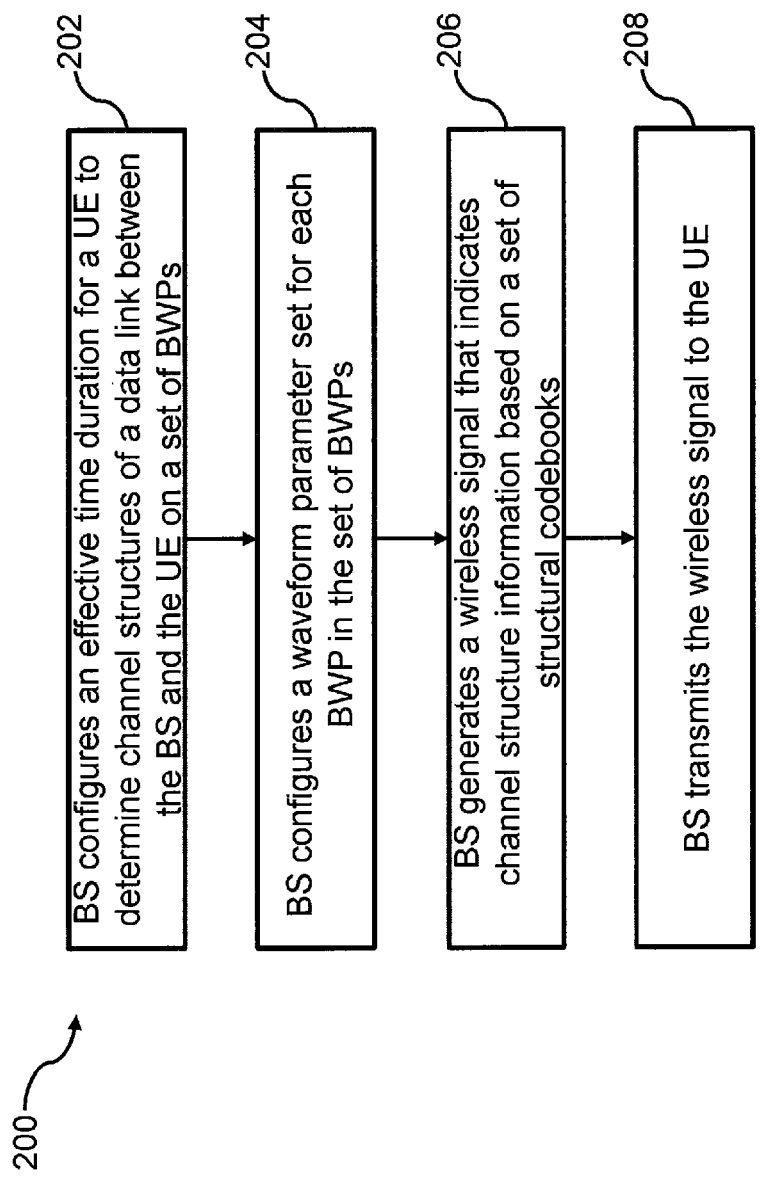
FIG. 2 illustrates a flow chart for a method performed by a BS for indicating channel structure information, in accordance with some embodiments of the present disclosure.

FIG. 2 illustrates a flow chart for a method 200 performed by a BS, e.g. the BS 100 in FIG. 1, for indicating channel structure information, in accordance with some embodiments of the present disclosure. At 202, BS configures an effective time duration for a UE to determine channel structures of a transmission link between the BS and the UE on a set of BWPs. At 204, BS configures a waveform parameter set for each BWP in the set of BWPs. At 206, BS generates a wireless signal that indicates channel structure information based on a set of structural codebooks that has been informed to the UE based on standardization or semi-static configuration. The BS then transmits the wireless signal to the UE at 208.

Figure 3:
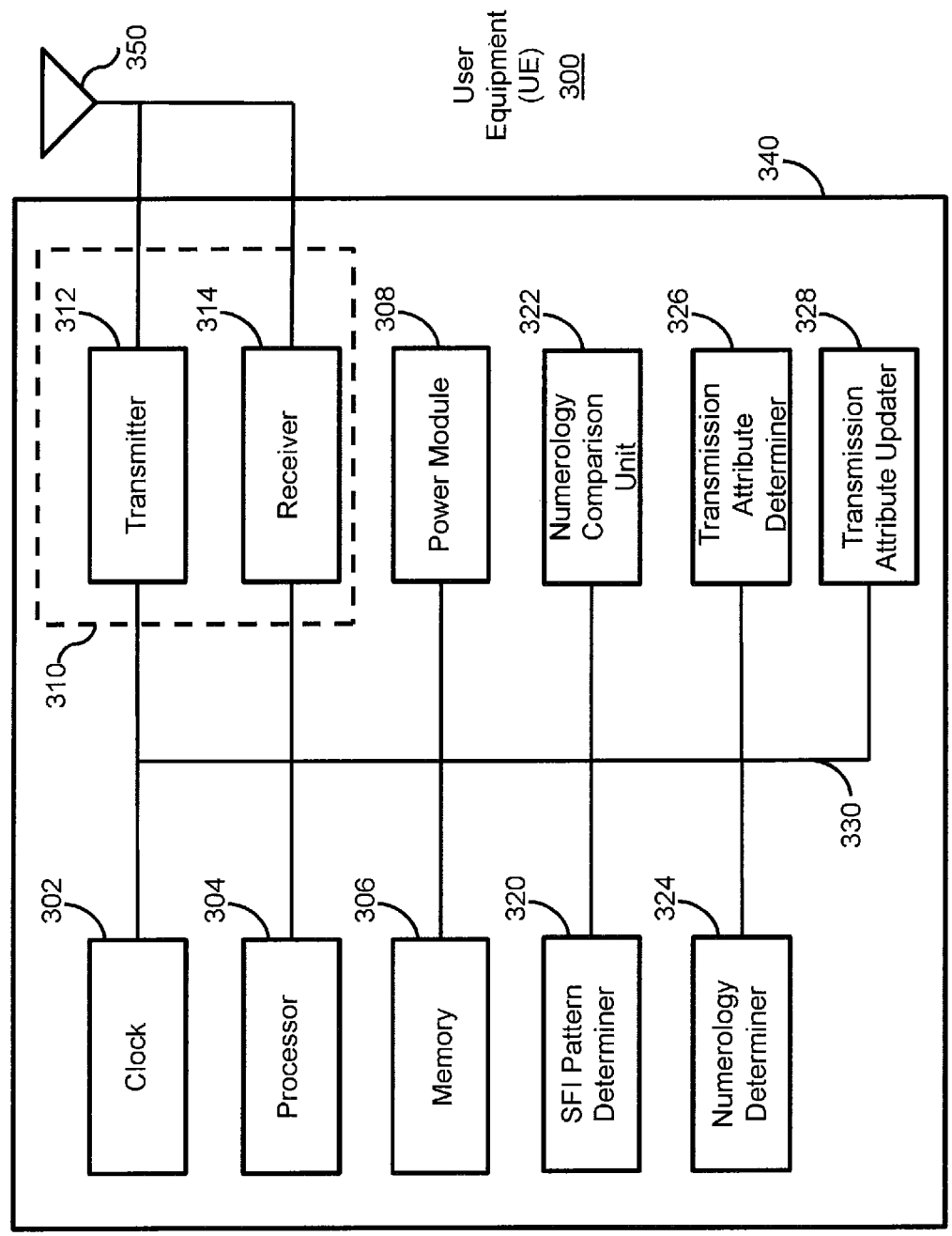
FIG. 3 illustrates a block diagram of a user equipment (UE), in accordance with some embodiments of the present disclosure.

FIG. 3 illustrates a block diagram of a user equipment (UE) 300, in accordance with some embodiments of the present disclosure. The UE 300 is an example of a device that can be configured to implement the various methods described herein. As shown in FIG. 3, the UE 300 includes a housing 340 containing a system clock 302, a processor 304, a memory 306, a transceiver 310 comprising a transmitter 312 and a receiver 314, a power module 308, an SFI pattern determiner 320, a Numerology comparison unit 322, a Numerology determiner 324, a transmission attribute determiner 326, and a transmission attribute updater 328.

In this embodiment, the system clock 302, the processor 304, the memory 306, the transceiver 310 and the power module 308 work similarly to the system clock 102, the processor 104, the memory 106, the transceiver 110 and the power module 108 in the BS 100. An antenna 350 is typically attached to the housing 340 and electrically coupled to the transceiver 310.

The SFI pattern determiner 320 may receive, via the receiver 314, a wireless signal from a BS, e.g. the BS 100, and obtain channel structure information indicated by the wireless signal. As discussed above, the wireless signal may be a group-common PDCCH signal that carries SFI being broadcasted to a group of UE devices associated with the BS. Based on the SFI indication obtained from the wireless signal, the SFI pattern determiner 320 can obtain a specific SFI pattern by looking up the structural codebooks that are determined based on standardization or semi-static configuration. The SFI pattern determiner 320 may send the indicated SFI pattern to the Numerology comparison unit 322 for Numerology comparison and to the transmission attribute determiner 326 for transmission attribute determination.

While the wireless signal is received and detected by the UE 300 on a first set of BWPs, the UE 300 may determine channel structure on a second set of BWPs including the first set of BWPs. The second set of BWPs may have same or different Numerologies. Each BWP in the first and second sets of BWPs may be determined based on at least one of: a standardization requirement, a semi-static configuration, a dynamic configuration, and other channel signals. The Numerology determiner 324 may determine the Numerology, referred to as target Numerology, for each BWP, referred to as target BWP, of the second set of BWPs based on at least one of: the wireless signal, a transmission Numerology of the target BWP, a standardization requirement, a semi-static configuration, a dynamic configuration, and other channel signals. The Numerology determiner 324 can send each target Numerology to the Numerology comparison unit 322 for Numerology comparison and to the transmission attribute determiner 326 for transmission attribute determination.

The Numerology comparison unit 322 may receive both the indicated SFI pattern from the SFI pattern determiner 320 and the target Numerologies from the Numerology determiner 324. In some embodiments, the indicated SFI pattern is irrelevant to any Numerology, but only relevant to a predetermined number of OFDM symbols, i.e. a slot length under the indicated SFI pattern. In this case, the Numerology comparison unit 322 can compare the slot length under the indicated SFI pattern with the slot length under each target Numerology. In other embodiments, the indicated SFI pattern is relevant to a specific Numerology, referred to as source Numerology. The source Numerology may be determined based on at least one of: a standardization requirement, a semi-static configuration, a dynamic configuration, and other channel signals. In this case, the Numerology comparison unit 322 can compare the source Numerology with each target Numerology. In either case, based on the comparison results, the Numerology comparison unit 322 may determine a channel structure translation scheme for the transmission attribute determiner 326 to determine transmission attributes of a transmission link between the BS 100 and the UE 300 on each target BWP. According to different embodiments, the translation scheme may include operations of concatenation and/or split that is only applied to OFDM symbols under the target Numerology within a predetermined time duration that represents an effective time range of the SFI indication.

The transmission attribute determiner 326 may determine transmission attributes of the transmission link between the BS 100 and the UE 300 on each target BWP in the predetermined time duration with respect to the target Numerology determined by the Numerology determiner 324, based on the indicated SFI pattern determined by the SFI pattern determiner 320 and according to the translation scheme determined by the Numerology comparison unit 322.

The transmission attribute updater 328 may receive, via the receiver 314, some updated transmission attribute indication from the BS 100, e.g. based on a UE specific DCI and/or a semi-static configuration signal. When there is a conflict between the transmission directions indicated by the SFI and the parallel indicator received by the transmission attribute updater 328, the transmission attribute updater 328 may update the transmission attributes based on the latest transmission attribute indication.

Figure 4:
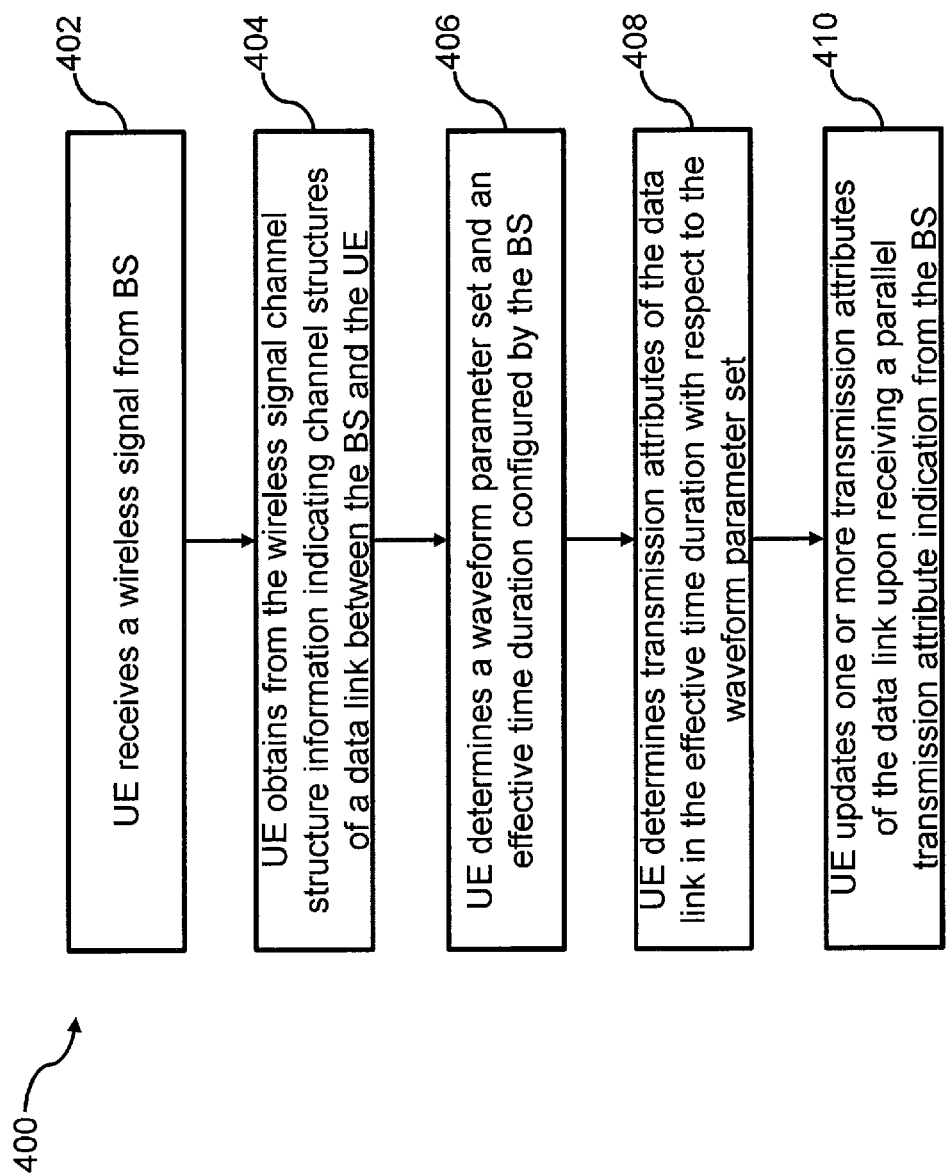
FIG. 4 illustrates a flow chart for a method performed by a UE for determining and updating channel structure information, in accordance with some embodiments of the present disclosure.

FIG. 4 illustrates a flow chart for a method 400 performed by a UE, e.g. the UE 300 in FIG. 3, for determining and updating channel structure information, in accordance with some embodiments of the present disclosure. At 402, UE receives a wireless signal from BS. At 404, UE obtains from the wireless signal channel structure information indicating channel structures of a transmission link between the BS and the UE. At 406, UE determines a waveform parameter set and an effective time duration configured by the BS. At 408, UE determines transmission attributes of the transmission link in the effective time duration with respect to the waveform parameter set. Optionally at 410, UE updates one or more transmission attributes of the transmission link upon receiving a parallel transmission attribute indication from the BS.

Different embodiments of the present disclosure will now be described in detail hereinafter. It is noted that the features of the embodiments and examples in the present disclosure may be combined with each other in any manner without conflict.

In Embodiment 1, the indicated SFI pattern corresponds to a predetermined number of OFDM symbols for a UE to determine channel structure under different target Numerologies. Based on standardization or semi-static configuration of BS, a UE can understand a set of codebooks of SFI patterns, including SFI pattern 1, SFI pattern 2 . . . SFI pattern N, where different SFI patterns represent different channel structure, e.g. slot structures. For example, SFI pattern 1 represents {7'D' 2'O' 5'U'}, SFI pattern 2 represents {12'D' 1'O' 1'U'}, SFI pattern 3 represents {2'D' 1'O' 10'U' 1'O'}, SFI pattern 4 represents {3'D' 2'O' 2'U'}, and so on, where "D" denotes an OFDM symbol or symbol group having a transmission attribute of "downlink", "U" denotes an OFDM symbol or symbol group having a transmission attribute of "uplink", and "O" denotes an OFDM symbol or symbol group having a transmission attribute of "other." All of the SFI patterns in the codebook set may indicate slot structures of a same number of OFDM symbols, or may indicate slot structures of different numbers of OFDM symbols. Whether the number is same or not, for a certain SFI pattern, it indicates a slot structure with a slot length of N0 OFDM symbols, where N0 is a positive integer, such as N0=7 or N0=14.

The UE receives an SFI indication from a CORESET (Control Resource Set) of a BWP, which indicates a certain SFI pattern in the codebook set, where the Numerology of the BWP is configured as Numerology 1. The slot under Numerology 1 contains N1 OFDM symbols. It can be understood that, while a transmission Numerology (Numerology of a transmitted BWP) is equal to a target Numerology in this embodiment, the transmission Numerology may be different from a target Numerology in some other embodiments.

By comparing N0 and N1, the UE can determine different translation schemes to for channel structure determination.

Figure 5:
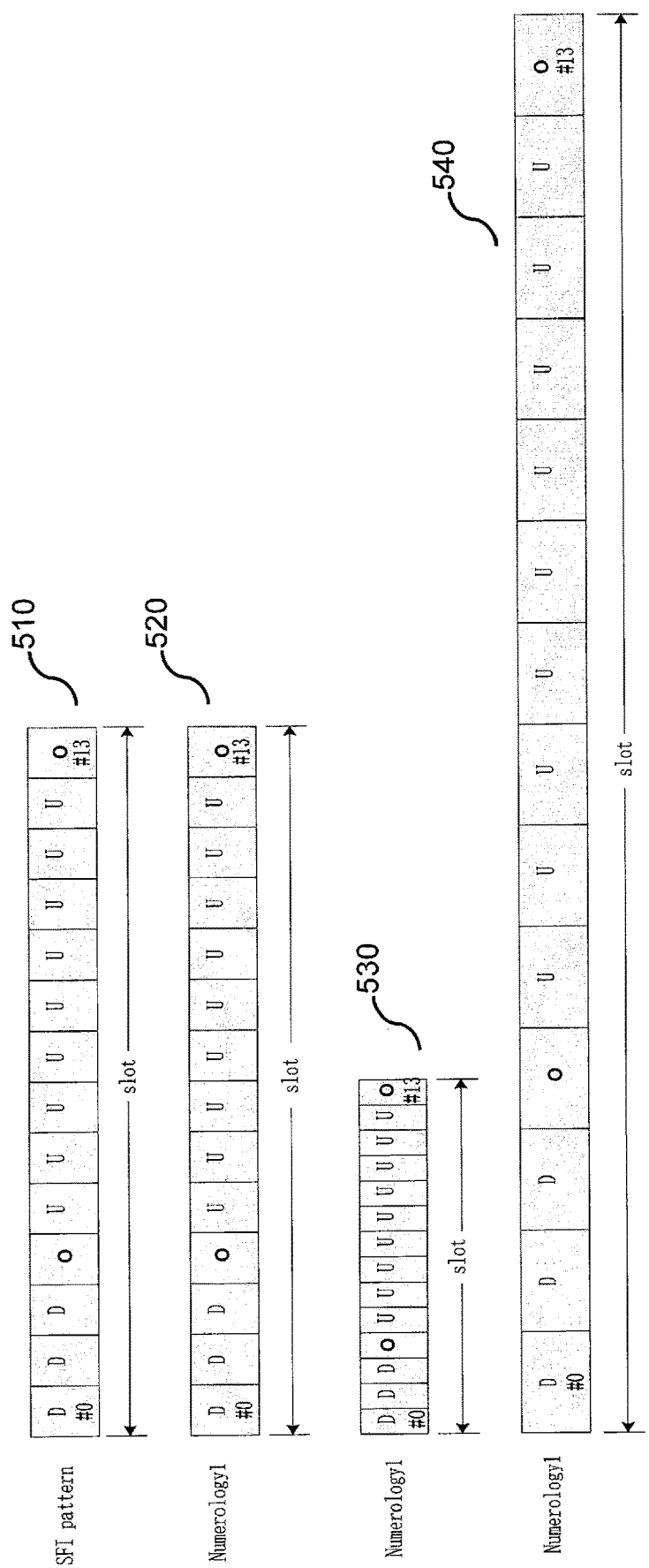
FIGS. 5-7 illustrate examples of channel structure determination under different waveform parameter sets, when an SFI pattern covers a predetermined number of OFDM symbols, in accordance with some embodiments of the present disclosure.

If N1 is equal to N0, the UE can do a one-to-one mapping for each OFDM symbol according to the indicated SFI pattern. As shown in FIG. 5, the UE can determine what the transmission attribute of N1 OFDM symbols is in each slot, within the effective slots indicated by SFI 510 and within the frequency domain of the BWP. FIG. 5 shows different examples 520, 530, 540 of OFDM symbol length (or sub-carrier spacing) under Numerology 1, where N0=N1=14. Regardless of the size of the OFDM symbol length (or sub-carrier spacing) under Numerology 1, the UE can simply map the transmission attribute of each OFDM symbol indicated in the SFI pattern 510 to a corresponding OFDM symbol under Numerology 1.

Figure 6:
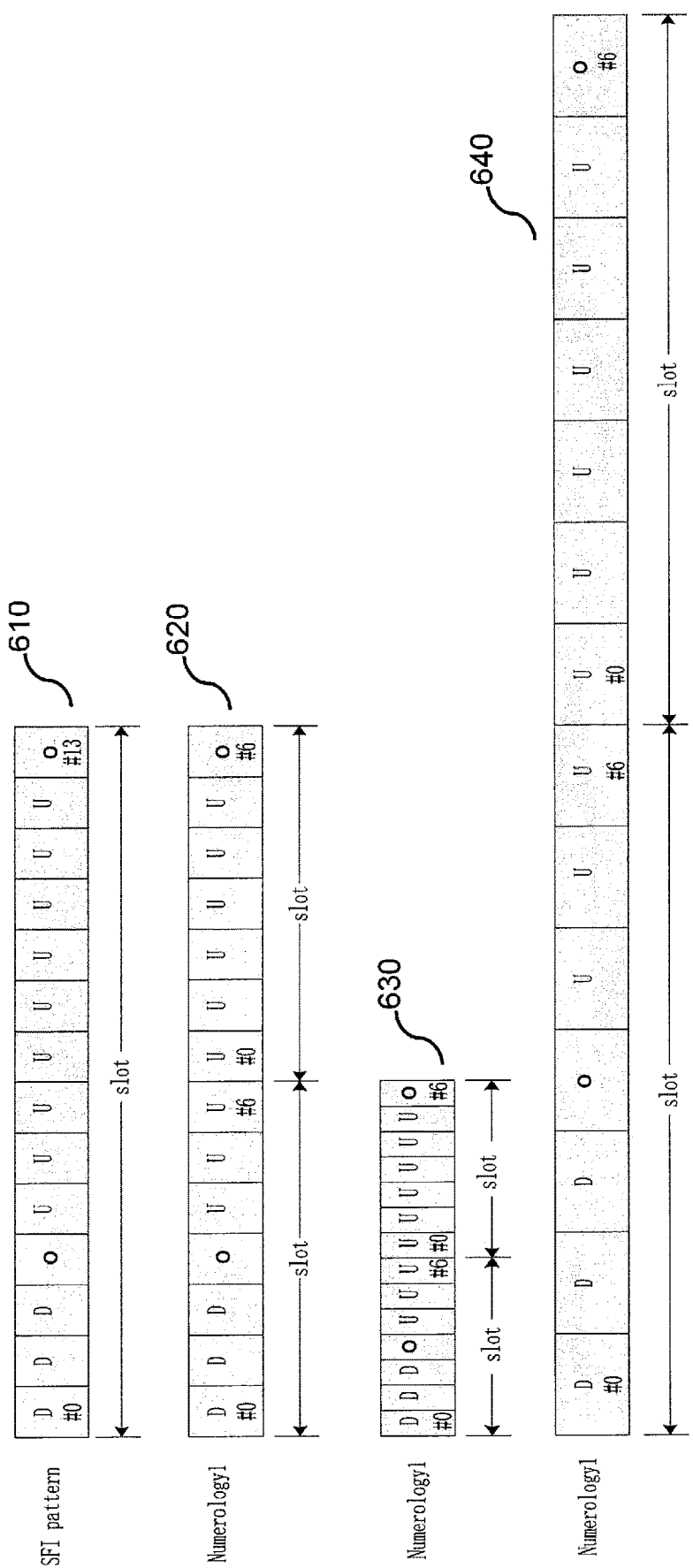

If N1 is less than N0, a slot indicated by SFI pattern may be split into multiple slots under Numerology 1. Normally, N0 is an integer multiple of N1, that is, N0=N1*k, k is a positive integer. As shown in FIG. 6, when N0=14 and N1=7, one N0 is split into two N1, then a slot structure of two concatenated slots under Numerology 1 corresponds to the slot structure indicated by the SFI pattern 610. FIG. 6 shows different examples 620, 630, 640 of OFDM symbol length (or subcarrier spacing) under Numerology 1. Regardless of the size of the OFDM symbol length (or subcarrier spacing) under Numerology 1, the terminal can simply map the transmission attribute of each of the N0 OFDM symbols in one slot under the SFI pattern to a corresponding OFDM symbol in k slots each including N1 OFDM symbols under Numerology 1, where the OFDM symbols in the k slots under Numerology 1 are assigned with transmission attributes one by one, according to the indication of the SFI pattern.

Figure 7:
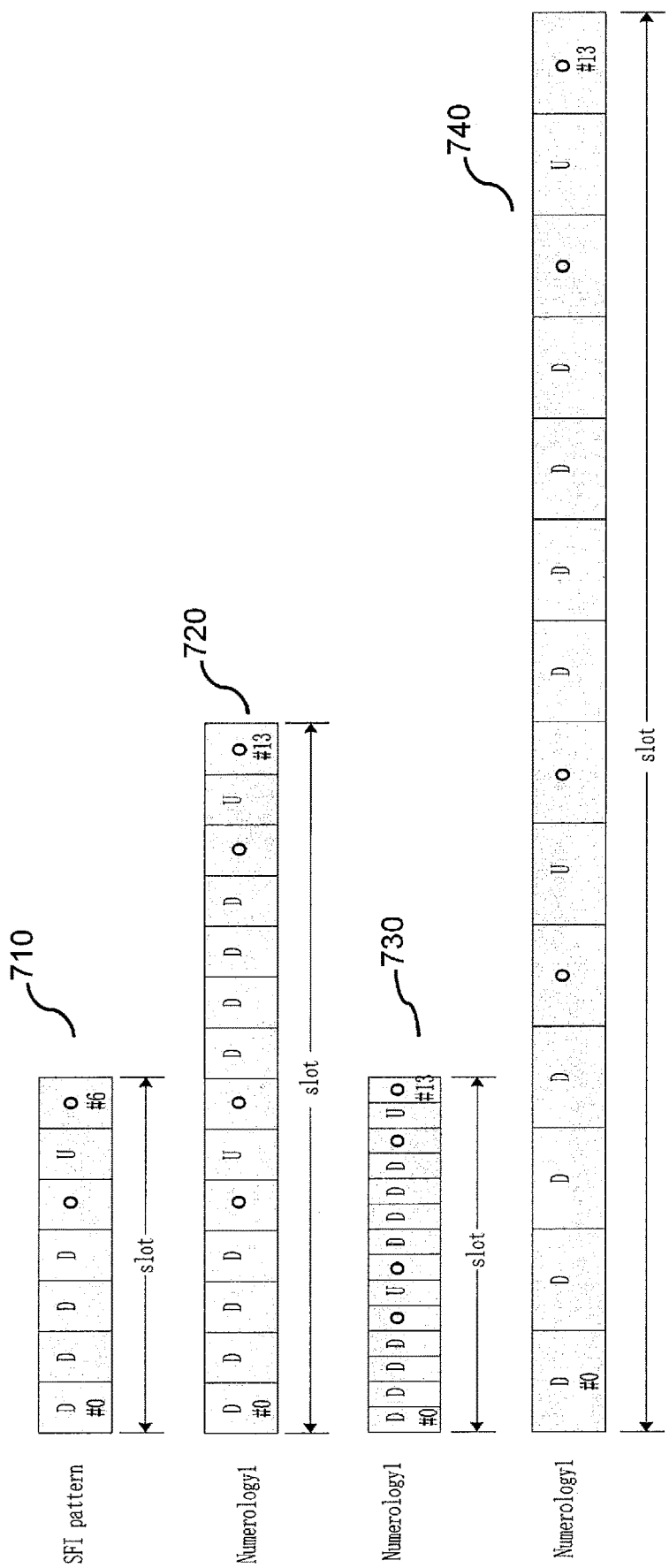

If N1 is greater than N0, UE can concatenate the slot structure indicated by SFI pattern to get the slot structure under Numerology 1. Normally, N1 is an integer multiple of N0, that is, N1=N0*k, k is a positive integer. As shown in FIG. 7, two slot structures containing N0 OFDM symbols indicated by SFI pattern 710 are concatenated, and the OFDM symbol transmission attributes of the concatenated slot structure are mapped to a slot containing N1 OFDM symbols under a Numerology 1. FIG. 7 shows different examples 720, 730, 740 of OFDM symbol length (or sub-carrier spacing) under Numerology 1. The size of the OFDM symbol length (or subcarrier spacing) under Numerology 1 does not affect the operation of transmission attribute assignment symbol-by-symbol after concatenation.

It can be understood that even when N1 is not an integer multiple of N0 and when N0 is not an integer multiple of N1, the dividing or concatenation operation may only be applied to the N1 symbols within the effective time duration.

It can be understood that while a channel structure in a codebook set corresponds to a slot in this embodiment, a channel structure in a codebook set may correspond to any of the following: one or more radio frames, one or more sub-frames, one or more slots, and one or more groups of slots, in various embodiments of the present teaching. It can also be understood that while each channel structure in this embodiment covers one or more OFDM symbols and shows a pattern of transmission attributes in a series of OFDM symbols, a channel structure pattern in general can show a pattern of transmission attributes in one or more time units, where each time unit may include any of the following: one or more OFDM symbols, one or more groups of OFDM symbols, one or more mini-slots, and one or more slots.

Embodiment 1 does not emphasize or require the length of a single OFDM symbol under SFI pattern. The length of a single OFDM symbol may or may not be identified, based on standardization or semi-static configuration of the SFI pattern. If the length of a single OFDM symbol is not identified, it is only necessary to provide the number of OFDM symbols corresponding to the SFI pattern.

Embodiment 1 can be applied to cases where the BS configures and activates a single BWP or a plurality of BWPs for the UE and cases where the BS transmits a single SFI or a plurality of SFIs to the UE, which includes the following cases.

In a first case, the BS configures and activates only one BWP for the UE. The UE detects and receives the SFI on a CORESET of the active BWP, reads the SFI pattern indication from the SFI of the active BWP, and determine a slot structure on the active BWP based on the indication by a method described in the embodiment.

In a second case, the BS configures and activates a plurality of BWPs for the UE. The UE detects and receives the SFI from only one BWP in the plurality of BWPs; reads the SFI pattern indication from the SFI; and determines a slot structure respectively on each of the plurality of active BWPs based on the indication by a method described in the embodiment.

In a third case, the BS configures and activates a plurality of BWPs for the UE. The UE detects and receives SFI on at least some (all or part, but more than one) of the plurality of BWPs. The UE may receive multiple SFIs. The UE reads the SFI pattern indication from BWP x, and determines the slot structure on the active BWP x based on the indication by a method described in the embodiment. The UE reads the SFI pattern indication from BWP y, and determines the slot structure on the active BWP y based on the indication by a method described in the embodiment. That is, the UE independently determines the slot structure of each BWP according to the SFI indication of each BWP.

In Embodiment 2, the indicated SFI pattern corresponds to a predetermined length of time, and the transmission attributes under different Numerologies are aligned in the time domain. Based on the standardization or semi-static configuration of BS, the UE can understand the codebook set under Numerology 0 (source Numerology), including SFI pattern 1, SFI pattern 2 . . . SFI pattern N, where different SFI patterns represent different slot structures under Numerology 0. The Numerology 0 has its own specific SCS, OFDM symbol length, the number of OFDM symbols contained in a slot, denoted as SCS0, OSL0, N0, respectively. Based on the OSL0 and N0, one can determine the slot length T0 under Numerology 0, where T0=OSL0*N0, where the source Numerology is determined based on at least one of: a standardization requirement, a semi-static configuration, a dynamic configuration, and other channel signals.

The UE reads SFI from a CORESET of a BWP to obtain an SFI pattern, where the Numerology of the BWP is configured as Numerology 1 (target Numerology). Numerology 1 has its own specific SCS, OFDM symbol length, the number of OFDM symbols contained in a slot, denoted as SCS1, OSL1, N1, respectively. Based on the OSL1 and N1, one can determine the slot length T1 under Numerology 1, where T1=OSL1*N1. It can be understood that, while a transmission Numerology (Numerology of a transmitted BWP) is equal to a target Numerology in this embodiment, the transmission Numerology may be different from a target Numerology in some other embodiments.

By comparing Numerology 0 and Numerology 1, the UE can determine different translation schemes to for channel structure determination.

Figure 8:
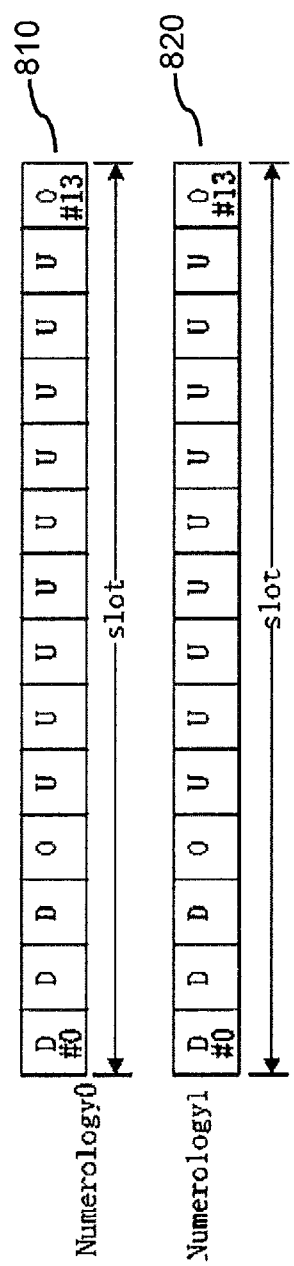
FIGS. 8-13 illustrate examples of channel structure determination with an alignment of transmission attributes under different waveform parameter sets, when an SFI pattern covers a predetermined length of time, in accordance with some embodiments of the present disclosure.

If Numerology 0 is the same as Numerology 1, that is, SCS0 is equal to SCS1, OSL0 is equal to OSL1, N0 is equal to N1, then after the UE reads the SFI pattern in SFI, the UE can directly map the SFI pattern indication about transmission attributes of each of the N0 symbols 810 under Numerology 0 to a corresponding one of the N1 symbols 820 under Numerology 1, as shown in FIG. 8.

If Numerology 0 is different from Numerology 1, there are three different cases as shown below.

Figure 9:
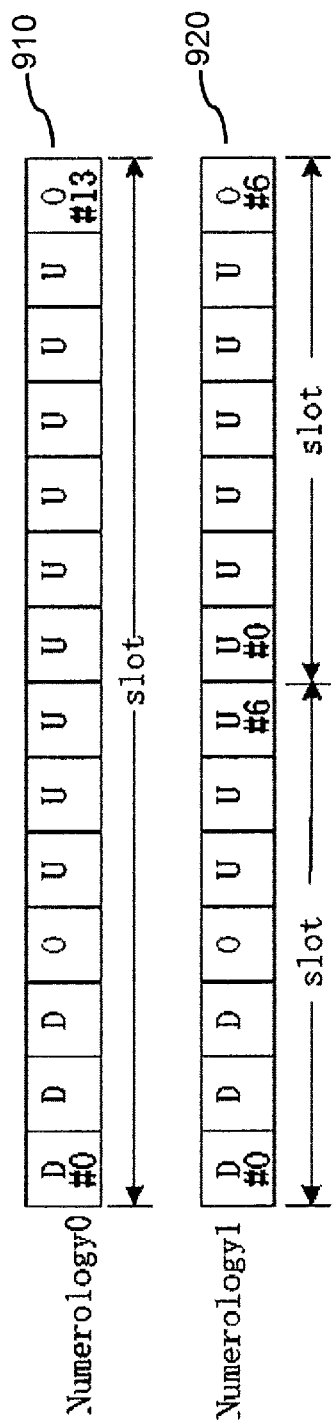
Figure 10:
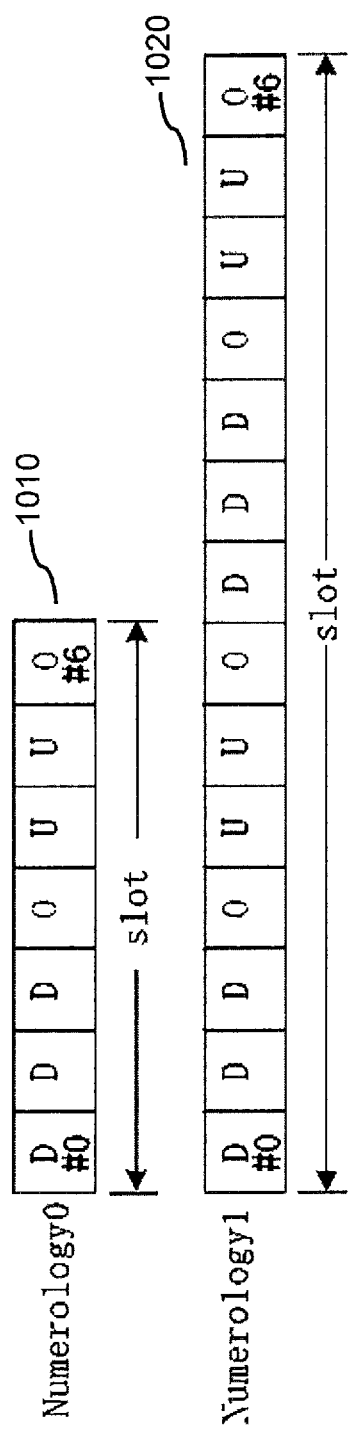

In a first case, SCS0 is equal to SCS1, OSL0 is equal to OSL1, but N0 is not equal to N1. When N0 is greater than N1, as shown in FIG. 9, one slot indicated by SFI pattern 910 under Numerology 0 is split into multiple slots 920 under Numerology 1. When N0 is less than N1, multiple slots indicated by SFI pattern 1010 under Numerology 0 are concatenated to one slot 1020 under Numerology 1, as shown in FIG. 10.

Figure 11:
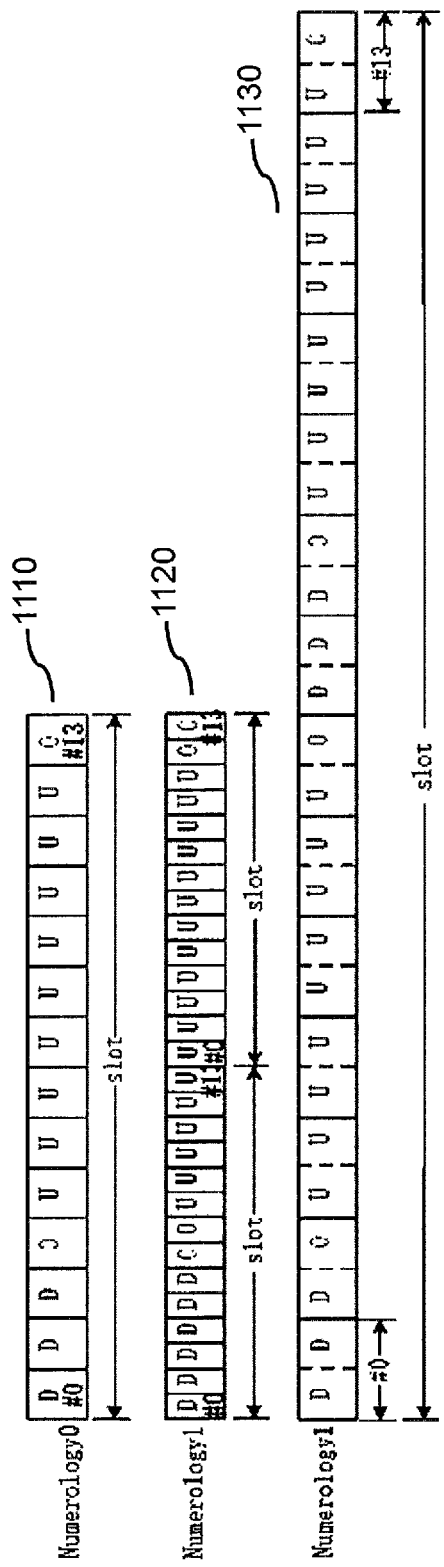

In a second case, SCS0 is not equal to SCS1, OSL0 is not equal to OSL1, N0 is equal to N1. As shown in FIG. 11, when OSL0 is greater than OSL1 (equivalent to when SCS0 is less than SCS1), usually T0=k*T1, k is positive integer, the transmission attribute of each OFDM symbol under Numerology 0 indicated by SFI pattern 1110 is mapped to multiple (k) OFDM symbols 1120 under Numerology 1; when OSL0 is less than OSL1 (equivalent to when SCS0 is greater than SCS1), typically T0=T1/k, k is a positive integer, the transmission attributes of multiple OFDM symbols 1110 under Numerology 0 indicated by SFI pattern are mapped to different parts of a corresponding one OFDM symbol 1130 under Numerology 1. Based on this method, it is ensured that the "D", "O", "U" fields of the two slot structures under Numerology 0 and Numerology 1 are aligned with each other in time domain. That is, the slot structure within a slot length T0 under Numerology 0 indicated by the SFI pattern is the same as the slot structure within a same time length as T0 (possibly k*T1 or T1/k) under Numerology 1.

Figure 12:
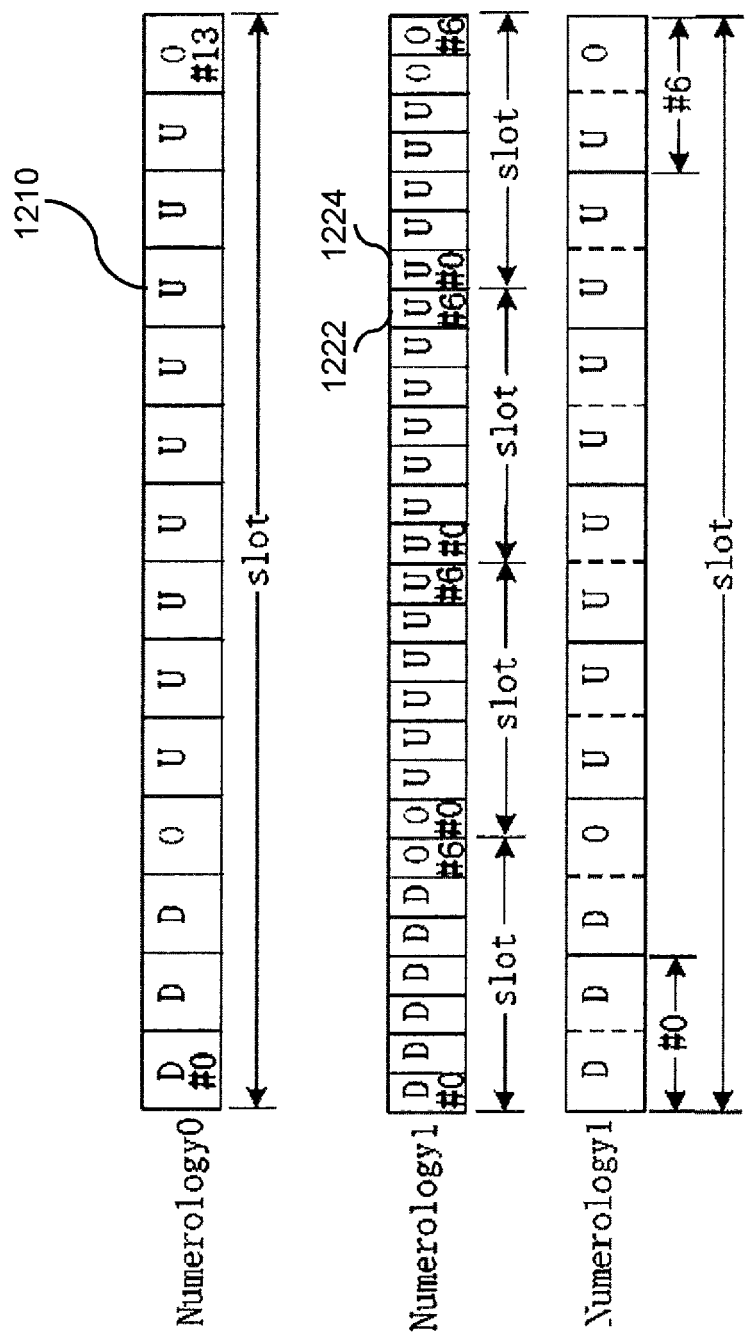
Figure 13:
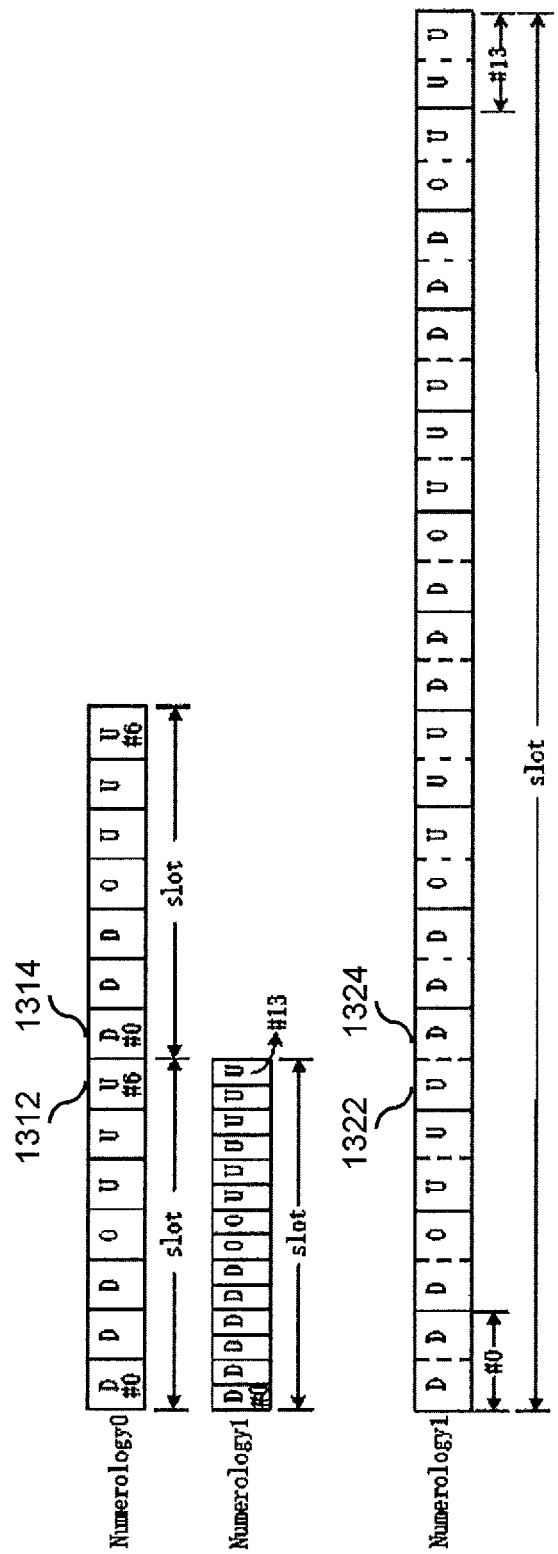

In a third case, SCS0 is not equal to SCS1, OSL1 is not equal to OSL1, and N0 is not equal to N1. As shown in FIG. 12 and FIG. 13, the method here is similar to that in the second case, with a purpose to ensure that the "D", "O", "U" fields of the two slot structures under Numerology 0 and Numerology 1 are aligned with each other in time domain. As shown in FIG. 12, the transmission attribute of one OFDM symbol 1210 under Numerology 0 indicated by SFI pattern may be mapped to two OFDM symbols 1222, 1224 in two different slots under Numerology 1. As shown in FIG. 13, the transmission attributes of two OFDM symbols 1312, 1314 in two different slots under Numerology 0 indicated by SFI pattern may be mapped to different parts 1322, 1324 of a corresponding one OFDM symbol under Numerology 1.

For the second case and the third case, when the slot length T1 under Numerology 1 is not equal to the slot length T0 under Numerology 0, one can determine the range of concatenation or split based on either (a) the SFI effective time duration determined by standardization requirements or semi-static configuration or a dynamic indication; or (b) the number of the SFI effective slots determined by semi-static configuration or a dynamic indication.

In a first situation, according to the standardization requirements or semi-static configuration or dynamic indication, the UE can determine that the effective time range of an SFI indication is M0 OFDM symbols. Then when the UE determines the slot structure under Numerology 1, the UE can only determine the slot structure within the effective time range M0*OSL0. The split or concatenation operation cannot be applied to the slots or OFDM symbols outside the effective time range (whether N0 is equal to N1*k or not, and whether N0 is equal to N1/k or not).

Alternatively, in the first situation, according to the standardization requirements or semi-static configuration or dynamic indication, the UE can determine that the effective time range of an SFI indication is M0 slots. Then when the UE determines the slot structure under Numerology 1, the UE can only determine the slot structure within the effective time range M0*T0. The split or concatenation operation cannot be applied to the slots or OFDM symbols outside the effective time range.

In a second situation, according to the standardization requirements or semi-static configuration or dynamic indication, the UE can determine that the effective time range of an SFI indication is M0 OFDM symbols. Then when the UE determines the slot structure under Numerology 1, the UE can only determine the slot structure within the effective time range M0*OSL1. The split or concatenation operation cannot be applied to the slots or OFDM symbols outside the effective time range.

Alternatively, in a second situation, according to the standardization requirements or semi-static configuration or dynamic indication, the UE can determine that the effective time range of an SFI indication is M0 slots. Then when the UE determines the slot structure under Numerology 1, the UE can only determine the slot structure within the effective time range M0*T1. The split or concatenation operation cannot be applied to the slots or OFDM symbols outside the effective time range.

It can be understood that while an effective time range of an SFI indication covers a single SFI pattern in this embodiment, an effective time range of an SFI indication may cover multiple SFI patterns in other embodiments. For example, an effective time range may cover 5 time slots, where the first two slots follow SFI pattern 1 and the rest three slots follow SFI pattern 2. In another example, an effective time range may cover a slot that includes a first half portion following SFI pattern 3 and a second half portion following SFI pattern 4.

In Embodiment 3, the method in Embodiment 2 is applied to multiple BWPs.

When the BS configures and activates N (N is an integer greater than 1) BWP for the UE, it is possible to configure the UE to detect and receive SFI on N BWPs or to detect or receive SFI on only one of the BWPs. Each BWP's Numerology can be configured independently. BS can configure the Numerology of BWP1 as Numerology 1, configure the Numerology of BWP2 as Numerology 2 . . . and configure the Numerology of BWP N as Numerology N.

The BS may configure the UE to detect and receive SFI on only one of the BWPs. Assuming that the BS configures the UE to detect and receive SFI on BWP x (x is a positive integer in [1, N]), then the slot pattern indicated by SFI corresponds to Numerology X. For the N-1 BWPs other than BWP x, whether or not the configured Numerology is the same as Numerology x, the UE determines the slot structure of all N BWPs based on the SFI under Numerology x. The specific method is the same as that of Embodiment 2.

The BS may also configure the UE to detect and receive SFI on each BWP. For BWP x, if its Numerology is Numerology x, then the slot pattern read by the BS on the BWP corresponds to Numerology x. For BWP y, if its Numerology is Numerology y, then the slot pattern read by the BS on the BWP corresponds to Numerology y.

In Embodiment 4, the indicated SFI pattern corresponds to a predetermined number of slots or OFDM symbols, and there is no need to ensure that the transmission attributes under different Numerologies are aligned in time domain. Based on the standardization or semi-static configuration of BS, the UE can understand the codebook set under Numerology 0, including SFI pattern 1, SFI pattern 2 . . . SFI pattern N, where different SFI patterns represent different slot structures under Numerology 0. The Numerology 0 has its own specific SCS, OFDM symbol length, the number of OFDM symbols contained in a slot, denoted as SCS0, OSL0, N0, respectively. Based on the OSL0 and N0, one can determine the slot length T0 under Numerology 0, where T0=OSL0*N0.

The UE reads SFI from a CORESET of a BWP to obtain an SFI pattern, where the Numerology of the BWP is configured as Numerology 1 (target Numerology). Numerology 1 has its own specific SCS, OFDM symbol length, the number of OFDM symbols contained in a slot, denoted as SCS1, OSL1, N1, respectively. Based on the OSL1 and N1, one can determine the slot length T1 under Numerology 1, where T1=OSL1*N1. It can be understood that, while a transmission Numerology (Numerology of a transmitted BWP) is equal to a target Numerology in this embodiment, the transmission Numerology may be different from a target Numerology in some other embodiments.

By comparing Numerology 0 and Numerology 1, the UE can determine different translation schemes to for channel structure determination.

Figure 14:
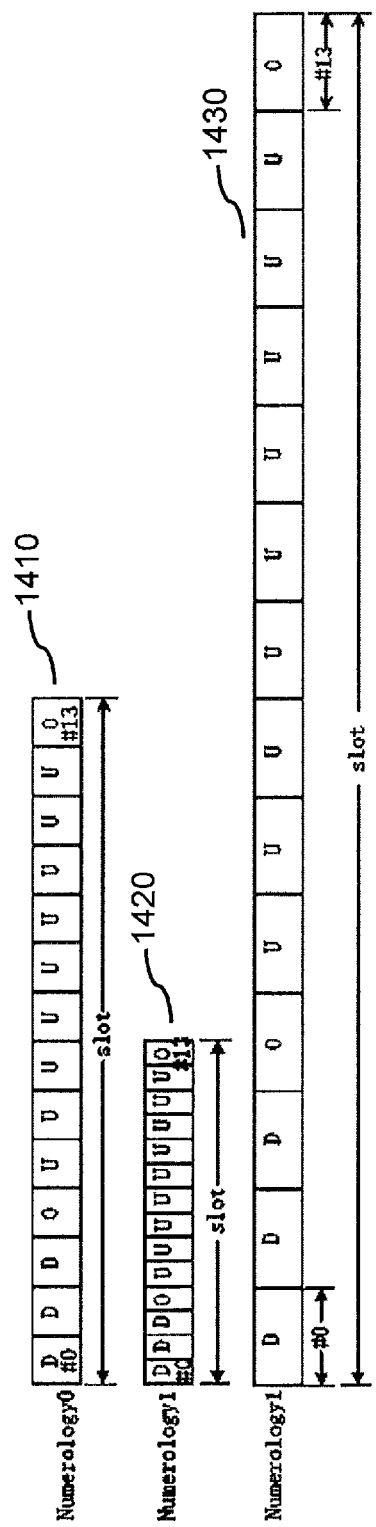
FIGS. 14-16 illustrate examples of channel structure determination without an alignment of transmission attributes under different waveform parameter sets, when an SFI pattern covers a predetermined number of slots or OFDM symbols, in accordance with some embodiments of the present disclosure.

If N0 under Numerology 0 is equal to N1 under Numerology 1, then the UE can directly map the transmission attribute indicated by SFI pattern of each of the N0 symbols 1410 to a corresponding one of the N1 symbols 1420, as shown in FIG. 14, without considering whether the OSL1 (or SCS1) under Numerology 1 is equal to the OSL0 (or SCS0) under Numerology 0.

Figure 15:
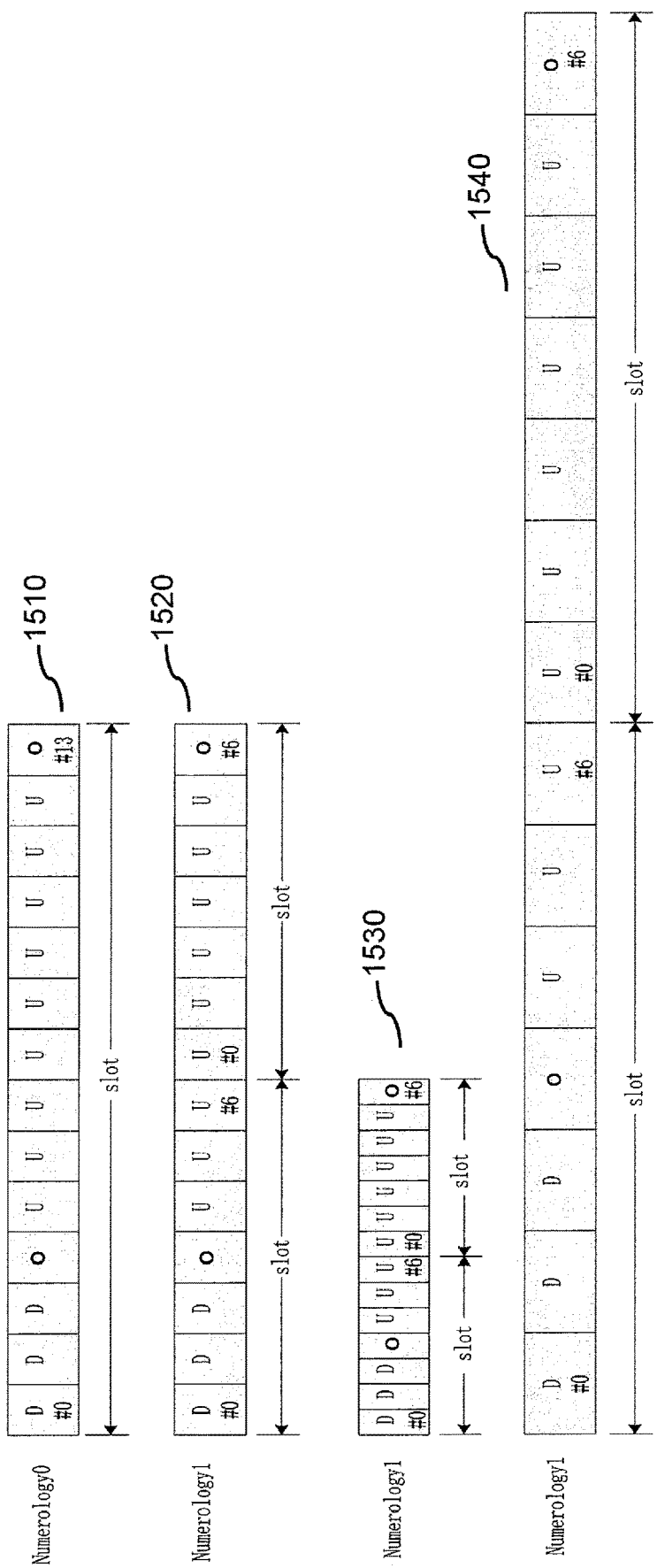
Figure 16:
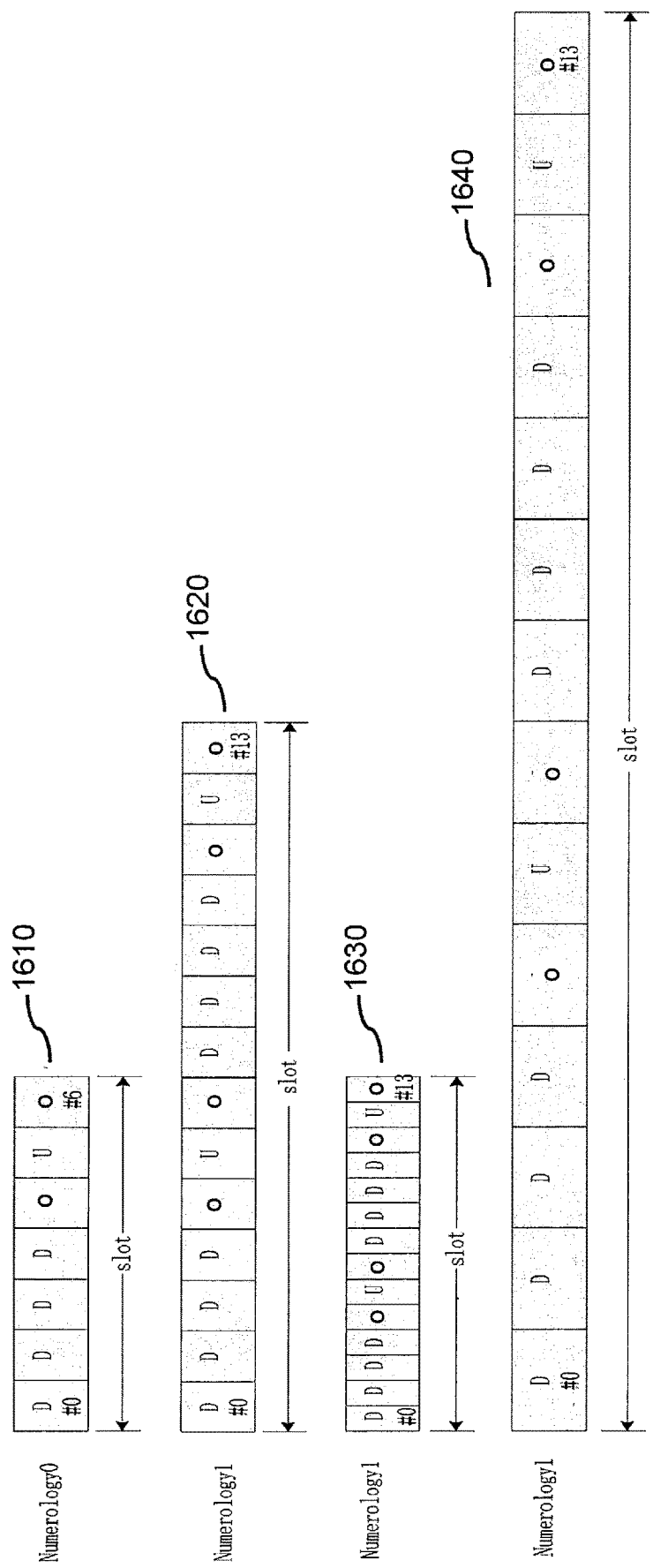

If N0 under Numerology 0 is not equal to N1 under Numerology 1, then when N0=k*N1, k is a positive integer, the UE can divide a slot 1510 under Numerology 0 into k slots 1520, 1530, 1540 under Numerology 1, and then determine the transmission attribute of each OFDM symbol under Numerology 1 according to the SFI pattern indication under Numerology 0, as shown in FIG. 15. When N0=N1/k (and k is a positive integer, the UE can concatenate k slots 1610 under Numerology 0 into one slot 1620, 1630, 1640 under Numerology 1, and then determine the transmission attribute of each OFDM symbol under Numerology 1 according to the SFI pattern indication under Numerology 0, as shown in FIG. 16. Similarly, the system does not consider whether the OSL1 (or SCS1) under Numerology 1 is equal to the OSL0 (or SCS0) under Numerology 0.

According to the standardization requirements or semi-static configuration or a dynamic indication, the UE can determine that the effective time range of an SFI indication is M0 OFDM symbols. Then when the UE determines the slot structure under Numerology 1, the UE can only determine the slot structure within the effective time range M0*OSL1. The split or concatenation operation cannot be applied to the slots or OFDM symbols outside the effective time range. Alternatively, according to the standardization requirements or semi-static configuration or a dynamic indication, the UE can determine that the effective time range of an SFI indication is M0 slots. Then when the UE determines the slot structure under Numerology 1, the UE can only determine the slot structure within the effective time range M0*T1. Again, the split or concatenation operation cannot be applied to the slots or OFDM symbols outside the effective time range.

In Embodiment 5, the method in Embodiment 4 is applied to multiple BWPs, where Embodiment 5 can follow steps similar to those in Embodiment 3.

Figure 17:
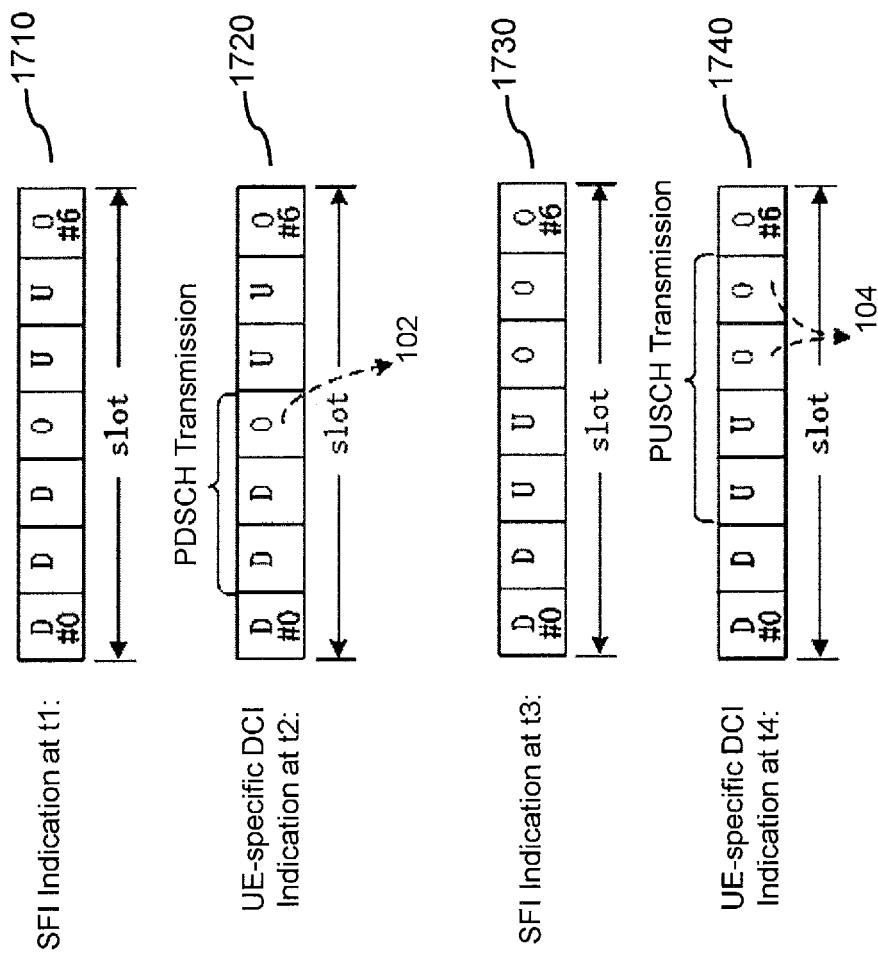
FIG. 17 illustrates a process for a UE to update transmission attributes of OTHER fields to receive and/or transmit semi-statically configured periodic or aperiodic downlink and/or uplink signals in the OTHER fields, in accordance with some embodiments of the present disclosure.

In Embodiment 6, a method is disclosed to solve an issue when the SFI indication conflicts with UE-specific DCI and/or a semi-static configuration signal. When certain conditions are met, the UE can receive a semi-statically configured periodic or aperiodic downlink signal, or send a semi-statically configured periodic or aperiodic uplink signal, on the OFDM symbol in an "O" field indicated by the SFI, as shown in FIG. 17.

At the time t1 1710, using one of the methods in Embodiments 1 to 5, the UE can determine the slot structure on a BWP based on the received SFI indication. The slot structure contains the "O" field. For the OFDM symbols having a transmission attribute of "O"; the UE cannot receive/transmit any downlink/uplink signals or downlink/uplink channels on these OFDM symbols.

At the time t2 1720, the UE receives a UE-specific DCI, which indicates that the OFDM symbols with the transmission attribute "O" are used for DL transmission. Then starting from t2, the UE, in addition to DL or UL transmission on the corresponding symbols indicated by the UE-specific DCI, can also receive a semi-statically configured periodic or aperiodic downlink signal, such as a CSI-RS (Channel State Information-Reference Signal), DMRS (De-Modulation Reference Signal), etc., on an OFDM symbol 102 that may be used for DL transmission and has a transmission attribute "O".

At time t3 1730, the UE receives the updated SFI indication and repeats the previous operations according to the updated SFI indication.

At time t4 1740, the UE receives a UE-specific DCI, which indicates that the OFDM symbols with the transmission attribute "O" are used for UL transmission. Then starting from t4, the UE, in addition to DL or UL transmission on the corresponding symbols indicated by the UE-specific DCI, can also transmit semi-statically configured periodic or aperiodic uplink signals, such as SRS (Sounding Reference Signal), DMRS, etc., on OFDM symbols 104 with a transmission attribute of "O" used for UL transmission.

In Embodiment 7, a method for determining a guard period (GP) between two transmissions of different directions is disclosed. The UE needs a transition time GP between the uplink transmission and downlink transmission or between the downlink transmission and the uplink transmission. In this embodiment, GP must be within a time range with a transmission attribute of "O" indicated by the SFI pattern. GP can occupy the entire "O" field or occupy just a part of the "O" field.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first node, the method comprising:
   receiving a wireless signal from a second node;
   obtaining channel structure information indicated by the wireless signal;
   determining a first waveform parameter set configured for the channel structure information indicated by the wireless signal; and
   determining transmission attributes of a transmission link between the first node and the second node in a predetermined time duration with respect to the first waveform parameter set based on the channel structure information.

2. The method of claim 1, wherein the transmission attributes include at least one of:
   a downlink (DL) field under which the first node can receive a downlink signal;
   an uplink (UL) field under which the first node can transmit an uplink signal; and
   an OTHER field under which the first node can either receive a downlink signal or transmit an uplink signal after receiving a dynamic indication from the second node indicating that the OTHER filed is updated to a DL field or a UL field, respectively, wherein each of the uplink signal and the downlink signal is a semi-statically configured signal.

3. The method of claim 1, wherein the predetermined time duration is determined based on an absolute time period irrelevant to any waveform parameter set.

4. The method of claim 1, wherein the predetermined time duration is determined based on a relative time period associated with a second waveform parameter set, wherein a length of the relative time period depends on values of the second waveform parameter set.

5. The method of claim 1, wherein:
the channel structure information indicates one or more channel structures included in a set of structural codebooks corresponding to a first time unit; and
each of the one or more channel structures covers one or more second time units in the predetermined time duration and a pattern of transmission attributes of the one or more second time units.

6. The method of claim 5, wherein:
the set of structural codebooks indicates channel structures covering a number of second time units under a third waveform parameter set that is determined based on a semi-static configuration.

7. The method of claim 5, wherein:
the transmission attributes in the predetermined time duration are determined based on an alignment of transmission attributes under different waveform parameter sets in the predetermined time duration.

8. A first communication apparatus comprising a processor, a memory and a wireless interface, wherein the memory stores instructions that, when executed, causes the processor to:
receive a wireless signal from a second communication apparatus;
obtain channel structure information indicated by the wireless signal;
determine a first waveform parameter set configured for the channel structure information indicated by the wireless signal; and
determine transmission attributes of a transmission link between the first communication apparatus and the second communication apparatus in a predetermined time duration with respect to the first waveform parameter set based on the channel structure information.

9. The first communication apparatus of claim 8, wherein the transmission attributes include at least one of:
a DL field under which the first communication apparatus can receive a downlink signal;
a UL field under which the first communication apparatus can transmit an uplink signal; and
an OTHER field under which the first communication apparatus can either receive a downlink signal or transmit an uplink signal after receiving a dynamic indication from the second communication apparatus indicating that the OTHER filed is updated to a DL field or a UL field, respectively, wherein each of the uplink signal and the downlink signal is a semi-statically configured signal.

10. A non-transitory computer-readable medium having computer-executable instructions stored thereon, the computer-executable instructions, when executed by a processor of a first node, causing the processor to implement a method comprising:
receiving a wireless signal from a second node;
obtaining channel structure information indicated by the wireless signal;
determining a first waveform parameter set configured for the channel structure information indicated by the wireless signal; and
determining transmission attributes of a transmission link between the first node and the second node in a predetermined time duration with respect to the first waveform parameter set based on the channel structure information.

11. The non-transitory computer-readable medium of claim 10, wherein the transmission attributes include at least one of:
a DL field under which the first communication apparatus can receive a downlink signal;
a UL field under which the first communication apparatus can transmit an uplink signal; and
an OTHER field under which the first communication apparatus can either receive a downlink signal or transmit an uplink signal after receiving a dynamic indication from the second communication apparatus indicating that the OTHER filed is updated to a DL field or a UL field, respectively, wherein each of the uplink signal and the downlink signal is a semi-statically configured signal.

* * * * *